K. FUKUDA.
ELASTIC ROLLER.
APPLICATION FILED OCT. 8, 1920.

1,417,240. Patented May 23, 1922.

Inventor.
Kinsuke Fukuda
by Connolly Bros
attys.

UNITED STATES PATENT OFFICE.

KINSUKE FUKUDA, OF YOKOHAMA, JAPAN.

ELASTIC ROLLER.

1,417,240.  Specification of Letters Patent.  Patented May 23, 1922.

Application filed October 8, 1920. Serial No. 415,636.

*To all whom it may concern:*

Be it known that I, KINSUKE FUKUDA, a subject of the Emperor of Japan, residing at Yokohama, Japan, have invented certain new and useful Improvements in Elastic Rollers, of which the following is a specification, reference being had therein to the accompanying drawing.

This invention has relation to elastic rollers and relates in particular to elastic rollers for clothes wringers.

The object of this invention is to provide a roller which, while it has a surface of sufficient hardness to effectively perform the required wringing or squeezing action, will be sufficiently yielding or elastic to prevent breaking of or other injury to buttons or other articles of hard material attached to the clothes submitted to the wringing operation.

In carrying this invention into effect I provide a central metallic core or arbor having a shaft projecting from each end to provide bearings and handle attaching means for the roller and I successively superimpose on this metallic core or arbor a coating or layer of comparatively hard rubber, a coating of comparatively soft sponge rubber and a third coating or layer of comparatively hard rubber, the several coatings or layers being strongly adherent to one another and the inner layer or coating being strongly adherent to the metallic core or arbor, so as to produce a roller having a comparatively hard wearing or contact surface, backed up by coating or layer of comparatively soft material that will permit the wearing or contact surface portion to yield under pressure or impact of a hard unyielding object, such as a button, so as to prevent breakage of the button or injury to the roller surface.

Figure 1:
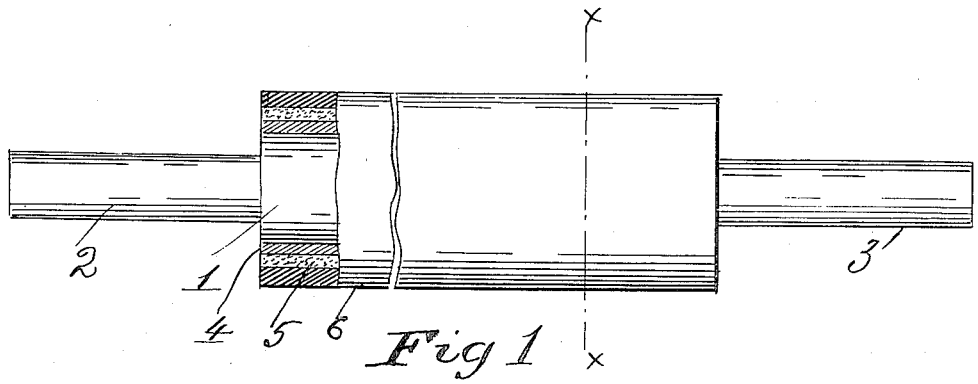
Figure 2:
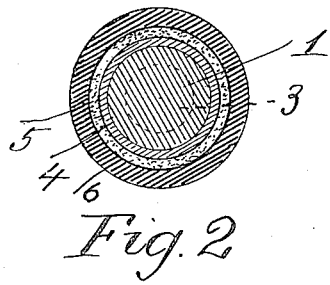

In the accompanying drawing:

Fig. 1, is a side elevation, partly in section, of a roller constructed according to my invention, and Fig. 2 is a cross sectional view on the line $x$—$x$ of Fig. 1.

The metallic core or arbor of the roller is of the usual size and form and is designated 1. This core or arbor is provided with shafts 2, 3, at its ends to afford bearing and handle attaching means for the roller.

A comparatively thin coating or layer 4, of dense rubber material, of the quality usually employed for the entire body or covering of the roller, is applied to the central metallic core or arbor 1, and upon and over the coating or layer 4, is applied a second coating or layer 5, of sponge rubber material of a quality which, when the roller is finished, will be sufficiently firm to sustain the required pressure to which the roller is submitted while in use without undue distortion and at the same time sufficiently elastic to permit so much yielding of the outer surface of the roller as will prevent injury to or destruction of any hard object, such as a button, that may come into contact with the roller and prevent injury to or defacement of the surface of the roller.

Another coating or layer 6, of dense rubber material is applied over and around the layer 5, and the roller is then heated in a mold and thereby vulcanized in the usual manner so as to impart to the several layers of rubber material the respective required degrees of hardness and elasticity.

It is to be noted that the central metallic core or arbor, 1, is of considerably greater diameter than the thickness of the combined layers of rubber, so as to afford such an amount of bearing surface for the rubber as will prevent the core from turning independently of the rubber. It is also to be noted that the rubber is vulcanized while on the core, thus causing the inner layer of rubber to adhere strongly to the core. It is further to be noted that the innermost layer of rubber is of much less thickness than the outer layer, being merely a shell to secure a firm attachment to the core.

I claim:

A roller for clothes wringers, comprising a metallic core, a thin layer of vulcanized rubber surrounding the core and coherent thereto, a substantial layer of sponge rubber surrounding and coherent to the first layer, and a third and external layer of dense, vulcanized rubber surrounding and coherent to the sponge rubber, the said metallic core being of a greater diameter than the thickness of the combined layers.

In testimony whereof I have affixed my signature.

KINSUKE FUKUDA.